US00RE39389E

(19) United States
(12) Reissued Patent
Kariyama

(10) Patent Number: US RE39,389 E
(45) Date of Reissued Patent: Nov. 14, 2006

(54) BICYCLE BRAKE DEVICE

(75) Inventor: Osamu Kariyama, Sakai (JP)

(73) Assignee: Shimano Inc., Osaka (JP)

(21) Appl. No.: 11/106,731

(22) Filed: Apr. 15, 2005

Related U.S. Patent Documents

Reissue of:
(64) Patent No.: 6,349,799
Issued: Feb. 26, 2002
Appl. No.: 09/526,129
Filed: Mar. 15, 2000

(51) Int. Cl.
*B62L 3/00* (2006.01)

(52) U.S. Cl. ..... 188/24.22; 188/24.12; 188/24.21

(58) Field of Classification Search ..... 188/24.11, 188/24.12, 24.21, 24.22
See application file for complete search history.

(56) References Cited

U.S. PATENT DOCUMENTS

| | | | | | |
|---|---|---|---|---|---|
| 5,082,092 | A | * | 1/1992 | Yoshigai | 188/24.21 |
| 5,503,252 | A | * | 4/1996 | Gelbein | 188/24.22 |
| 5,743,284 | A | | 4/1998 | Lumpkin | |
| 5,788,019 | A | * | 8/1998 | Lee et al. | 188/24.11 |
| 5,788,020 | A | * | 8/1998 | Tseng | 188/24.12 |
| 5,960,913 | A | * | 10/1999 | Kuo | 188/24.19 |
| 6,039,153 | A | * | 3/2000 | Sugimoto | 188/24.22 |
| 6,155,383 | A | * | 12/2000 | Sugimoto | 188/24.12 |

FOREIGN PATENT DOCUMENTS

| | | |
|---|---|---|
| FR | 2501615 | 9/1982 |
| JP | 63-57194 | 4/1988 |
| JP | 63-189791 | 12/1988 |

* cited by examiner

*Primary Examiner*—James McClellan
*Assistant Examiner*—Mariano Sy
(74) *Attorney, Agent, or Firm*—Global IP Counselors, LLP

(57) ABSTRACT

A bicycle brake device has a first brake arm body, a first lid, a second brake arm body and a second lid. The first brake arm body has a first attachment opening and a first fastener recess located adjacent to the first attachment opening. The second brake arm body has a second attachment opening and a second fastener recess located adjacent to the second attachment opening. The second brake arm body is adapted to be operatively coupled to the first brake arm body to move the first and second brake arm bodies between a release position and a braking position. The first lid is detachably coupled to the first brake arm body to overlie the first fastener recess. The second lid is detachably coupled to the second brake arm body to overlie the second fastener recess. First and second covers can also be provided to overlie the attachment openings of the brake arm bodies. The lids can be attached to the brake arm bodies in a variety of ways. In one example, the lids are completely detachable from the brake arm bodies. In another example, the lids are partially detachable from the brake arm bodies.

25 Claims, 11 Drawing Sheets

BICYCLE BRAKE DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to bicycle brake devices having a pair of brake arms with brake shoes attached thereto. More specifically, the present invention relates to a lid or cover for an attachment portion of the brake shoes that is coupled to the brake arms of the bicycle brake device.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In particular, bicycle components are constantly becoming lighter and less expensive while maintaining a high level of performance. Moreover, bicycle components are constantly being designed so as to be more durable and attractive. One particular component that has been extensively redesigned over the past years is the operation of the brake device of the bicycle.

The most common type of bicycle brake devices typically have a pair of brake arms with brake shoes attached thereto. The brake arms of the brake device each typically have a slot for attaching one of the brake shoe with a brake pad thereto. More specifically, this slot receives a fixing bolt that is secured to the brake arm by a nut and several washers. Typically, the attachment opening is an elongated slot for allowing adjustability. The fixing bolt, washers and nut are typically exposed to the environment. Therefore, the brake shoe attachment portion is easily contaminated or gets rusty due to the exposure to rain, water or other contaminants. This can make it difficult to remove the brake shoes from the brake arm. Moreover, this connection often results in an unattractive appearance of the brake device.

In view of the above, there exists a need for a bicycle brake device which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle brake device in which the brake shoes are attached to the brake arms in a concealed manner.

Another object of the present invention is to provide a bicycle brake device in which the brake shoes are attached to the brake arms to provide an attractive appearance.

Still another object of the present invention is to provide a bicycle brake device that is relatively inexpensive to manufacture yet provides increased protection for the attachment portion of the brake shoes.

The foregoing objects can basically be attained by providing a brake arm for a bicycle brake device, the brake arm comprising a brake arm body having an attachment opening and a fastener recess located adjacent the attachment opening; and a lid detachably coupled to the brake arm body to overlie the fastener recess.

The foregoing objects can further be attained by providing a bicycle brake device comprising a first brake arm body, a first lid, a second brake arm body, and a second lid. The first brake arm body has a first attachment opening and a first fastener recess located adjacent the first attachment opening. A cover can also be provided to over lie the attachment opening of the brake arm body.

The first lid is detachably coupled to the first brake arm body to overlie the first fastener recess. The second brake arm body has a second attachment opening and a second fastener recess located adjacent the second attachment opening. The second brake arm body is adapted to be operatively coupled to the first brake arm body to move the first and second brake arm bodies between a release position and a braking position. The second lid is detachably coupled to the second brake arm body to overlie the second fastener recess. First and second covers can also be provided to over lie the attachment openings of the brake arm bodies.

The lids can be attached to the brake arm bodies in a variety of ways. In accordance with one aspect of the present invention, the lids are completely detachable from the brake arm bodies. In accordance with another aspect of the present invention, the lids are partially detachable from the brake arm bodies.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
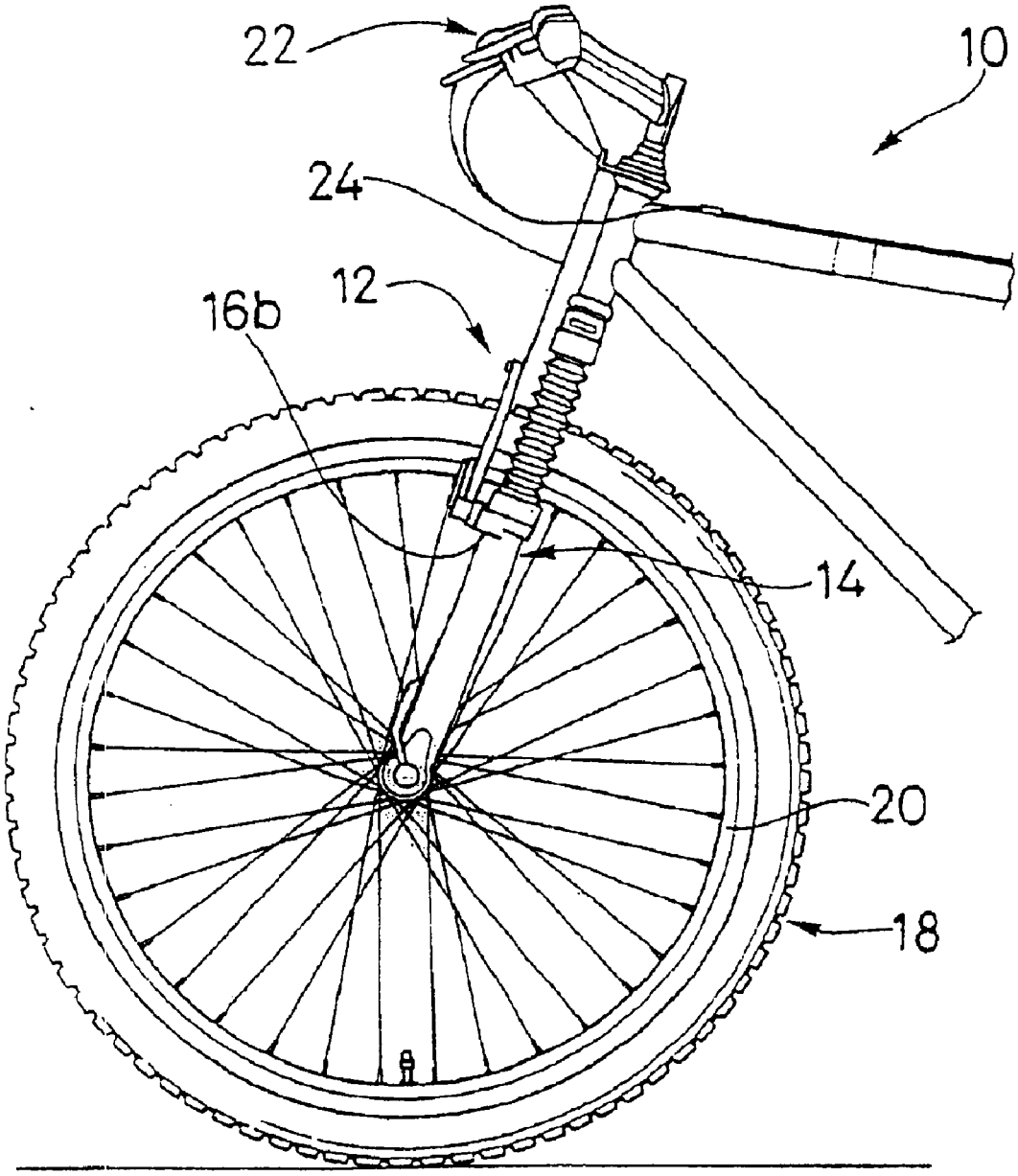
FIG. 1 is a partial, side elevational view of a conventional bicycle using a bicycle brake device in accordance with a first embodiment of the present invention.
Figure 2:
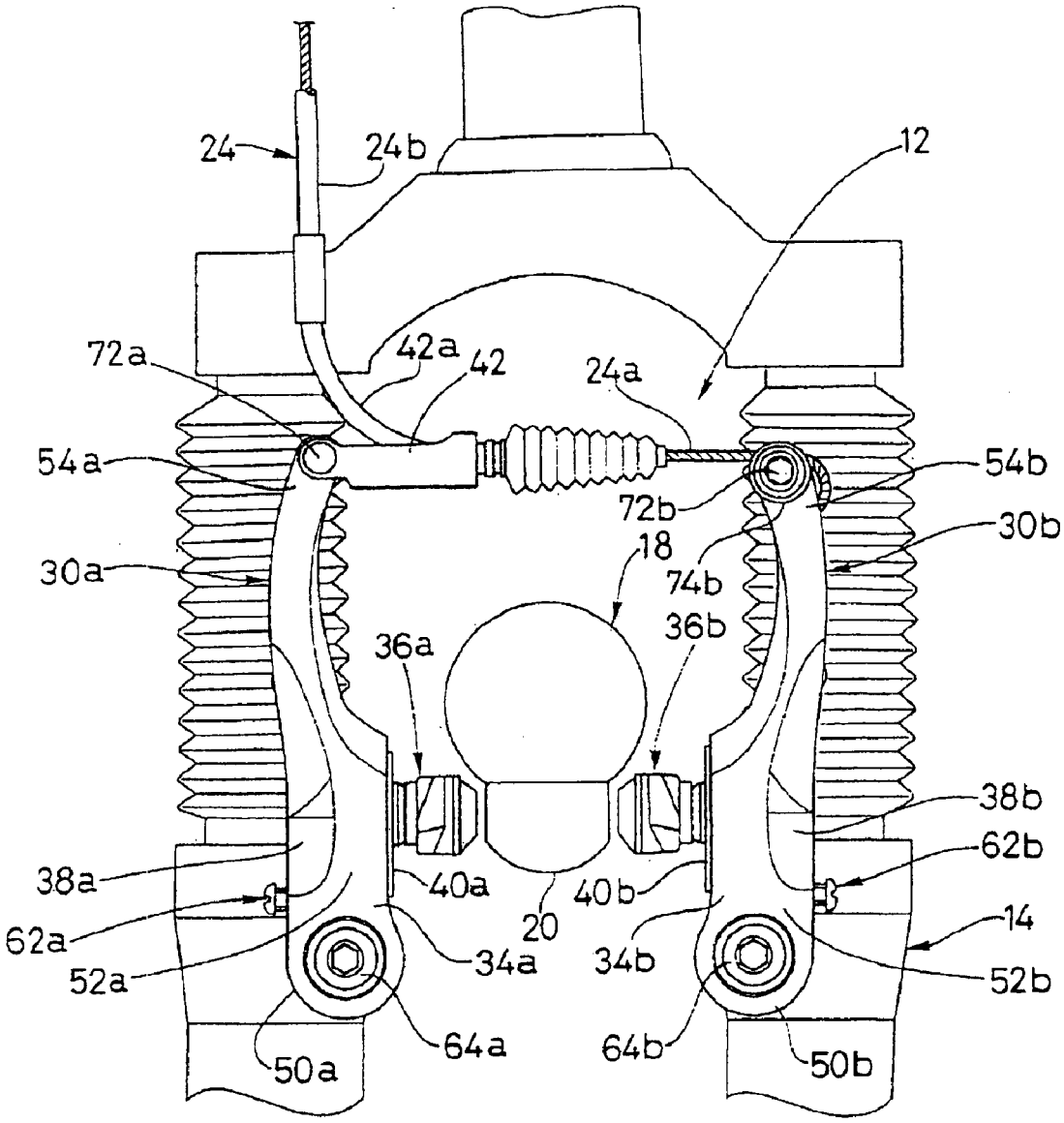
FIG. 2 is a partial front elevational view of the bicycle frame with the brake device attached thereto in accordance with the first embodiment of the present invention.
Figure 3:
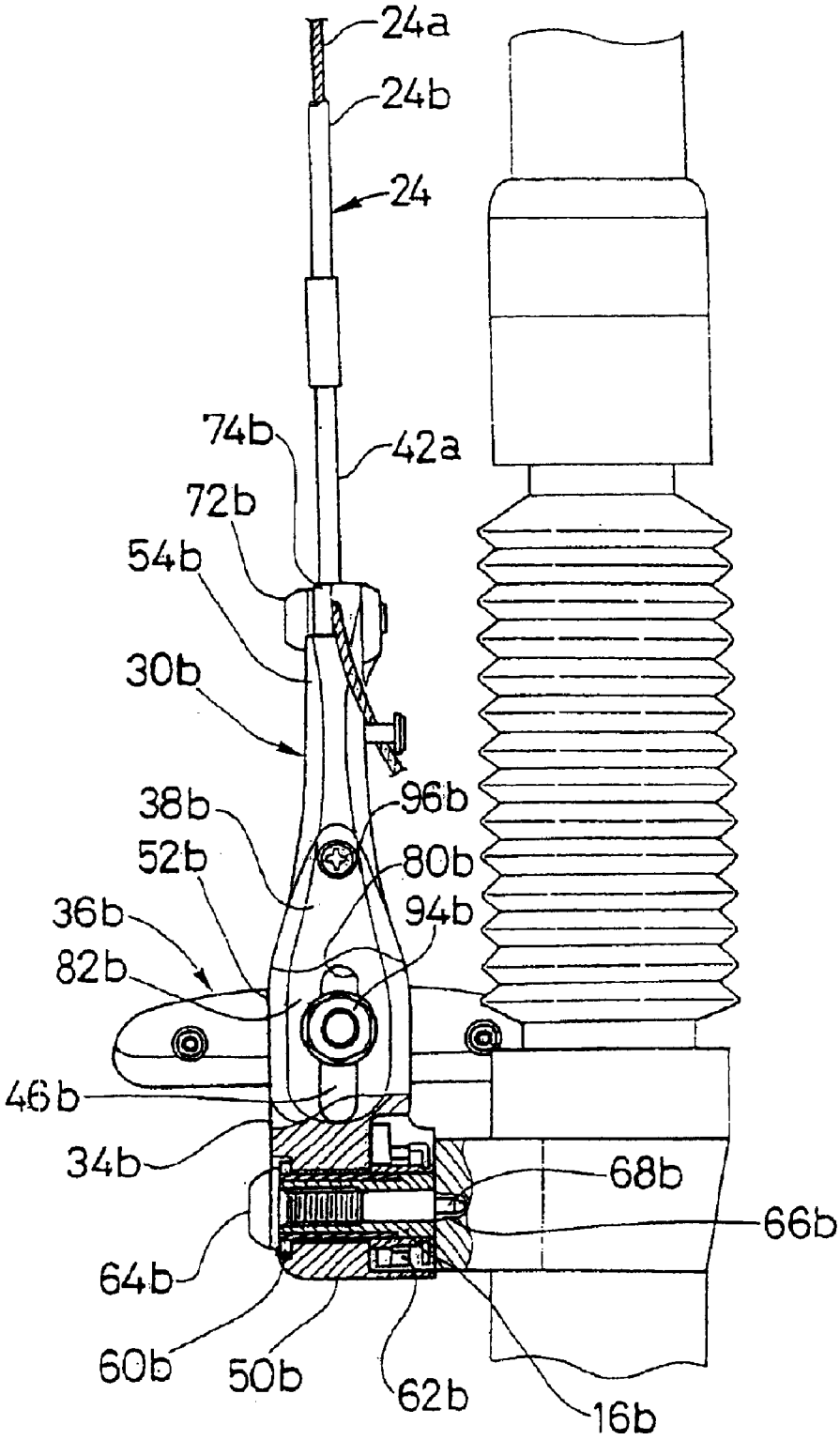
FIG. 3 is a partial side elevational view of the bicycle frame and the brake device with a portion of one of the brake arms broken away for purposes of illustration.
Figure 4:
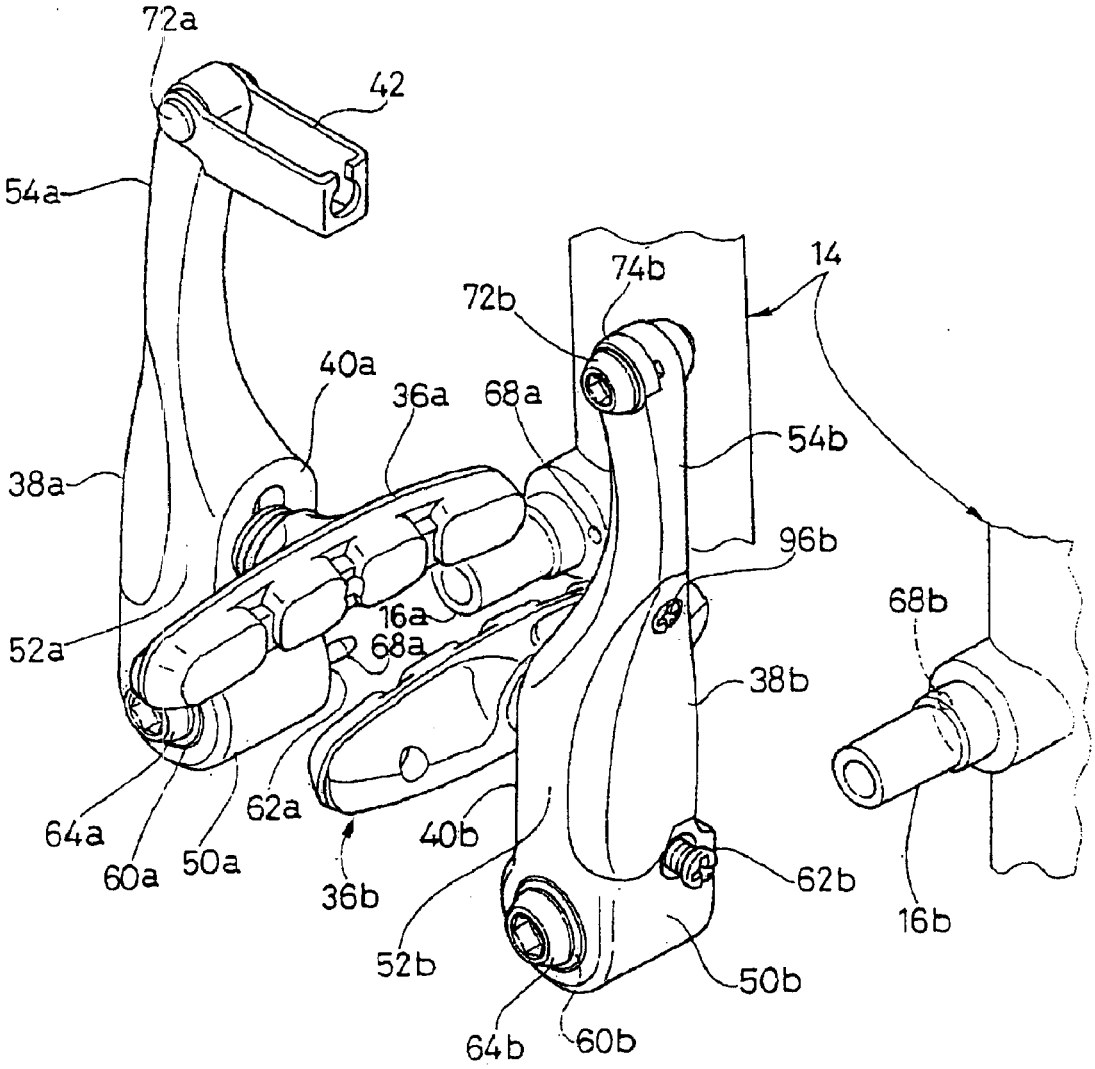
FIG. 4 is a front perspective view of the brake device in accordance with the first embodiment of the present invention.
Figure 5:
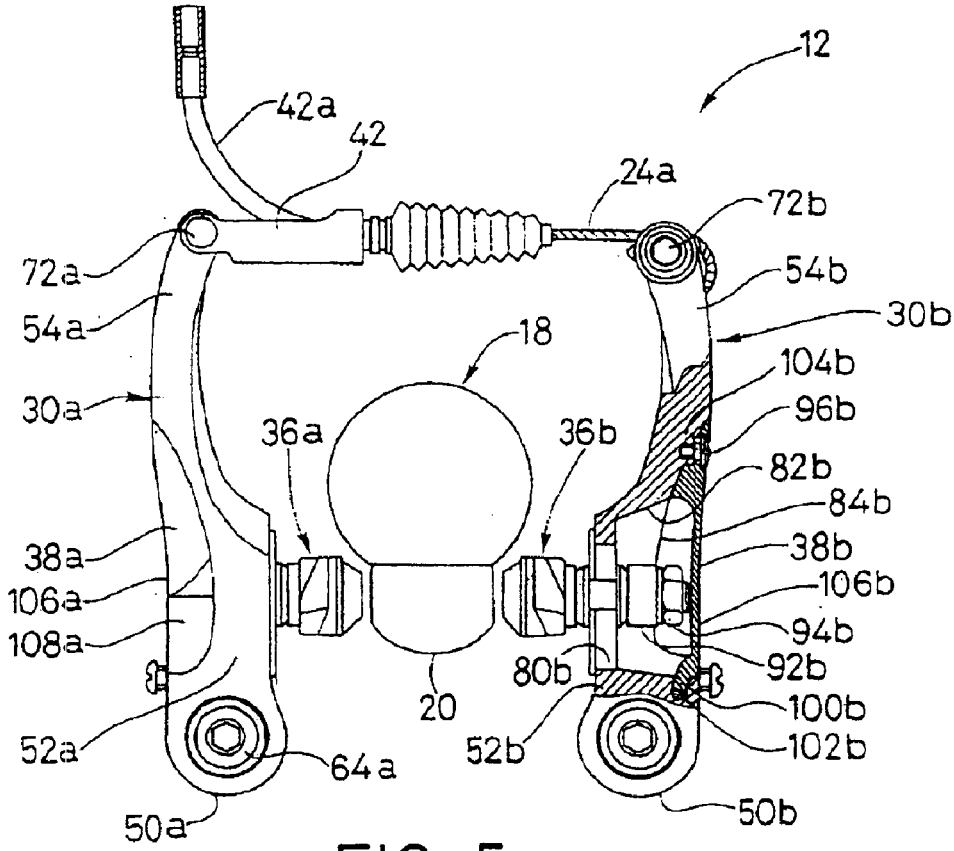
FIG. 5 is a front elevational view of the brake device illustrated in FIGS. 2–4 with portions broken away for purposes of illustration.
Figure 6:
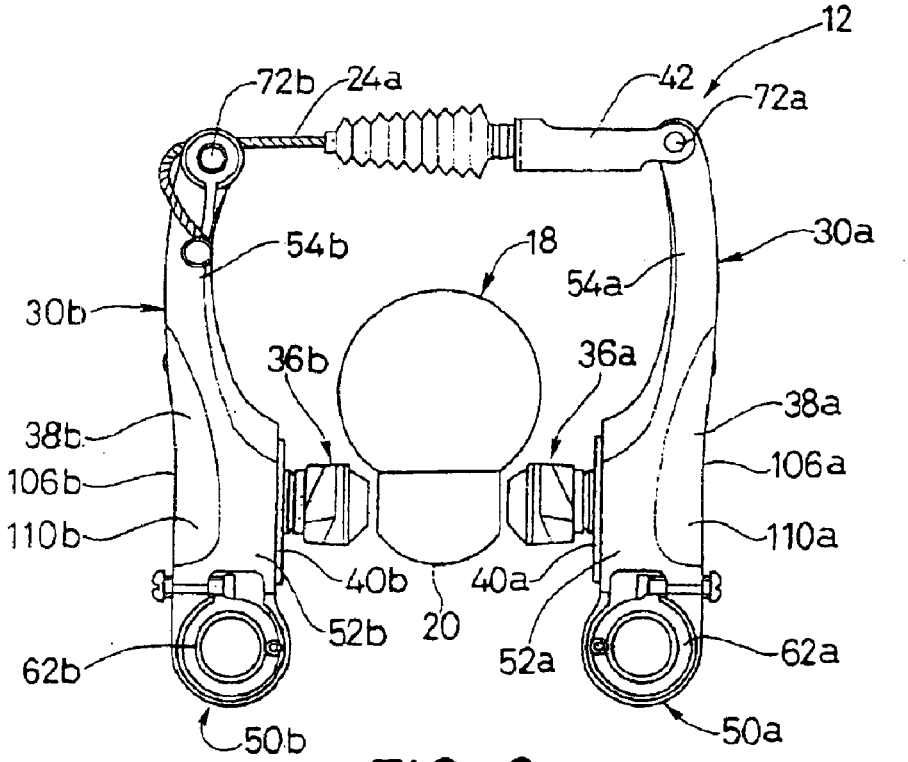
FIG. 6 is a rear elevational view of the brake device illustrated in FIGS. 2–5 in accordance with the first embodiment of the present invention.

Referring initially to FIGS. 1–4, a front portion of a conventional bicycle 10 is illustrated having a bicycle brake device 12 in accordance with the present invention. Bicycles and their various components are well-known in the prior art, and thus, bicycle 10 and its various components will not be discussed or illustrated in detail herein, except for the components of bicycle 10 which relate to brake device 12 in accordance with the present invention. In other words, only bicycle brake device 12 will be discussed and illustrated in detail herein. Moreover, since most brake devices are well known to those skilled in the art, brake device 12 will only be discussed and illustrated to the extent needed to understand the present invention.

Brake device 12 is illustrated as being coupled to front fork 14 of bicycle 10 in a relatively conventional manner. Of course, it will be apparent to those skilled in the art from this disclosure that brake device 12 can be coupled to the rear fork or another portion of bicycle 10 as needed and/or desired. As shown in FIGS. 2 and 4–6, brake device 12 is a cantilever type of brake device. Of course, it will also be apparent to those skilled in the art from this disclosure that the present invention can be adapted to other types of brake devices.

Basically, the brake device 12 is movably coupled to the front fork 14 of the bicycle 10 such that it can move between a release position and a braking position. Preferably, the brake device 12 is pivotally coupled on the mounting posts 16a and 16b as explained below. In the release position, the brake device 12 does not engage rim 20 so that wheel 18 is free to rotate. In the braking position, the brake device 12 is pivoted to grip the rim 20 of the wheel 18 to prevent rotation of the wheel 18. In particular, the rider will operate the brake operating device 22 which in turn will pull cable 24 to cause the brake device 12 to engage the rim 20 of the wheel 18 in a conventional manner.

Basically, the brake device 12 has first and second brake arms 30a and 30b which are pivotally coupled at their lower ends to front fork 14 and coupled to cable 24 at their upper ends. Generally, the brake arm 30a is a mirror image of the brake arm 30b, except for the manner in which the cable 24 is attach thereto.

Brake arm 30a has a brake arm body 34a, a brake shoe 36a, a lid 38a and a cover 40a. Similarly, brake arm 30b has a brake arm body 34b, a brake shoe 36b, a lid 38b and a cover 40b. As explained below in more detail, the upper ends of brake arm bodies 34a and 34b are interconnected by a connecting link 42 and an end of cable 24 such that brake arm bodies 34a and 34b pivot together in a conventional manner.

Brake arm bodies 34a and 34b are cantilevered arms that are pivotally mounted to the front fork 14 of bicycle 10 for movement between a release position and a braking position. More specifically, the brake arm body 34a has a lower pivot and or mounting section 50a, a center brake shoe attachment section 52a and an upper cable attachment end 54a. Similarly, brake arm 30b has a lower pivot end or mounting section 50b, a center brake shoe attachment section 52b and an upper cable attachment end 54b. The constructions of brake arm bodies 34a and 34b are relatively conventional, except for the center brake shoe attachment sections 52a and 52b. Therefore, the remaining portions of the brake arm bodies 34a and 34b will only be briefly described herein to understand the present invention.

Turning now to FIGS. 7 and 9–13, the left brake arm body 34a will first be discussed herein. The pivot end 50a of the brake arm body 34a has a pivot hole or opening 60a with a biasing mechanism 62a coupled therein. A threaded fastener or screw 64a extends into the pivot opening 60a and is threaded into an internal threaded bore of the mounting post 16a to pivotally couple the brake arm body 34a to front fork 14.

The biasing mechanism 62a has a pin 66a that is received in an opening 68a located at the base of the mounting post 16a of the front fork 14. Thus, the biasing mechanism 62a normally applies a rotational force about the pivot fastener 64a such that the brake arm body 34a is normally biased outwardly to a release position. The biasing mechanism 62a is well known in the prior art, and therefore, the biasing mechanism 62a will not be discussed or illustrated in detail herein.

The upper end 54a of the brake arm body 34a has a bore 70a that receives a fastener 72a for pivotally attaching one end of the connecting link 42 thereto. The other end of the connecting link is operatively coupled to a sleeve 42a that surrounds the inner wire 24a of the brake cable 24. Thus, the fastener 72a and the connecting link 42 form a cable attachment member.

Turning now to the center brake shoe attachment section 52a of the brake arm body 34a, an attachment opening or slot 80a is formed in the center brake shoe attachment section 52a of the brake arm body 34a for attaching the brake shoe 36a thereto. The center brake shoe attachment section 52a also has a fastener recess 82a that is designed to accommodate the attachment portion of the brake shoe 36a. The inside part of the fastener recess 82a has the attachment opening or slot 80a, while the outside part of the fastener recess 82a has a wide opening 84a. When the lid 38a and the cover 40a are attached to the brake arm body 34a, the fastener recess 82a is completely enclosed. In other words, the fastener recess 82a becomes an enclosed cavity when the lid 38a and the cover 40a are attached to the brake arm body 34a.

Turning now to FIGS. 14–18, the right brake arm body 34b will now be discussed herein. The pivot end 50b of the brake arm body 34b has a pivot hole or opening 60b with a biasing mechanism 62b coupled therein. A threaded fastener or screw 64b extends into the pivot opening 60b and is threaded into a mounting post 16b with an internal threaded bore to pivotally couple the brake arm body 34b to front fork 14.

The biasing mechanism 62b has a pin 66b that is received in an opening 68b located at the base of the mounting post 16b of the front fork 14. Thus, the biasing mechanism 62b normally applies a rotational force about the pivot fastener 64b such that the brake arm body 34b is normally biased outwardly to a release position. The biasing mechanism 62b is well known in the prior art, and therefore, the biasing mechanism 62b will not be discussed or illustrated in detail herein.

The upper end 54b of the brake arm body 34b has a threaded bore 70b that receives a clamping screw 72b with a washer 74b for attaching the inner wire 24a of the brake cable 24 thereto.

Referring again to FIG. 7, the brake shoe 36a has a brake shoe support or attachment portion 86a with a brake pad 88a removably supported on one lateral side and a fixing bolt or threaded post 90a extending out of the other lateral side. The fixing bolt 90a has a set of washers 92a and a nut 94a located thereon for attaching the attachment portion 86a to the brake arm body 34a via the attachment opening 80a of the brake shoe arm body 34a. The attachment opening 80a is an elongated slot that has its longitudinal axis extending substantially parallel to a longitudinal axis of the brake arm 34a. Accordingly, the brake shoe 36a can be vertically adjusted relative to the brake arm body 34a within the attachment opening 80a.

When the brake shoe 36a is attached to the brake arm body 34a, the shoe attachment portion 86a and two of the washers 92a are located on the inner side of the brake arm body 34a, while the other washers 92a and the attachment nut 94a are located on the other side of the brake arm body 34a. When the lid 38a and the cover 40a are attached to the brake arm body 34a, the thread portion of the fixing bolt 90a and two of the washers 92a and the attachment nut 94a are completely enclosed within the fastener recess 82a.

Referring again to FIG. 8, the brake shoe 36b has a brake shoe support or attachment portion 86b with a brake pad 88b removably supported on one lateral side and a fixing bolt or threaded post 90b extending out of the other lateral side. The fixing bolt 90b has a set of washers 92b and a nut 94b located thereon for attaching the attachment portion 86b to the brake arm body 34b via the attachment opening 80b of the brake shoe arm body 34b. The attachment opening 80b is an elongated slot that has its longitudinal axis extending substantially parallel to a longitudinal axis of the brake arm 34b. Accordingly, the brake shoe 36b can be vertically adjusted relative to the brake arm body 34b within the attachment opening 80b.

When the brake shoe 36b is attached to the brake arm body 34b, the shoe attachment portion 86b and two of the washers 92b are located on the inner side of the brake arm body 34b, while the other washers 92b and the attachment nut 94b are located on the other side of the brake arm body 34b. When the lid 38b and the cover 40b are attached to the brake arm body 34b, the thread portion of the fixing bolt 90b and two of the washers 92b and the attachment nut 94b are completely enclosed within the fastener recess 82b.

Turning now to FIGS. 19–24, the left lid 38a is illustrated in more detail. In the illustrated embodiment, the lid 38a is a mirror image of the lid 38b. Thus, lid 38b will not be illustrated in detail herein. Of course, the shapes of lids 38a and 38b can be different from each other if needed and/or desired. As mentioned above, the lids 38a and 38b are detachably coupled to the brake arm bodies 34a and 34b to overlie the openings 84a and 84b of the fastener recesses 82a and 82b that are opposite the attachment openings 80a and 80b. Accordingly, the lids 38a and 38b conceal the threads of the fixing bolts 90a and 90b, the outer pair of washers 92a and 92b and the nuts 94a and 94b therein. This prevents contaminants such as dirt, water, etc., from corroding or otherwise damaging the threads of the fixing bolts 90a and 90b and the nuts 94a and 94b.

The lids 38a and 38b are preferably U-shaped members that has their external surface substantially flush with the surrounding external surfaces of the brake arm bodies 34a and 34b so as to provide a smooth and attractive appearance between the brake arm bodies 34a and 34b and the lids 38a and 38b. In other words, the exterior surfaces of the brake arm bodies 34a and 34b and the lids 38a and 38b are substantially flush with one another where they meet together.

Figure 7:
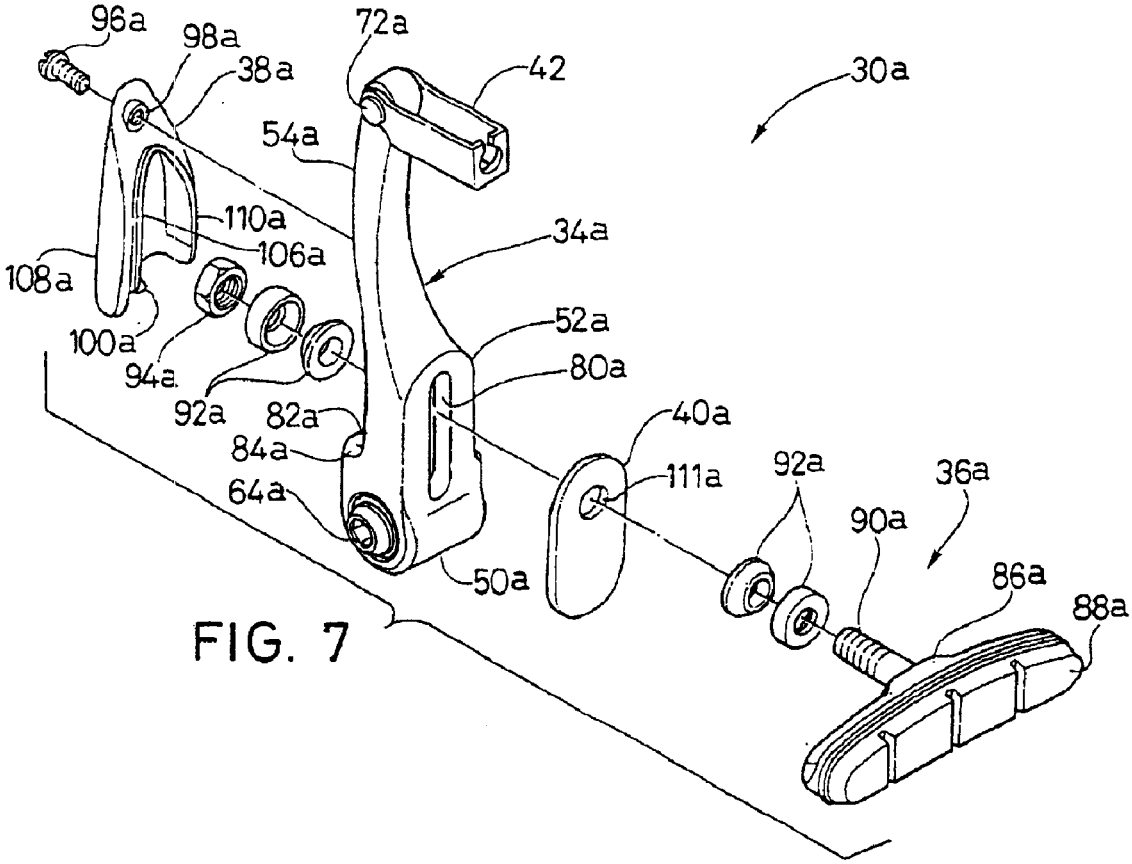
FIG. 7 is an exploded perspective view of the left brake arm of the brake device illustrated in FIGS. 2–6 in accordance with the first embodiment of the present invention.
Figure 8:
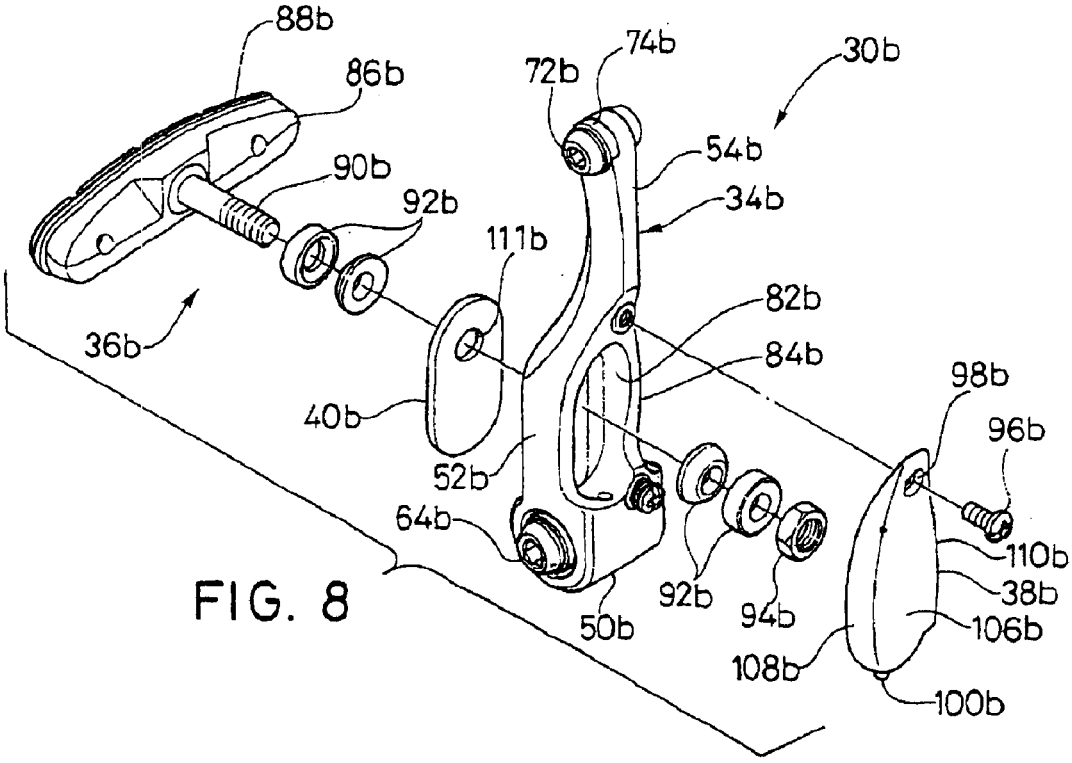
FIG. 8 is an exploded perspective view of the right brake arm of the brake device illustrated in FIGS. 2–6 in accordance with the first embodiment of the present invention.
Figure 9:
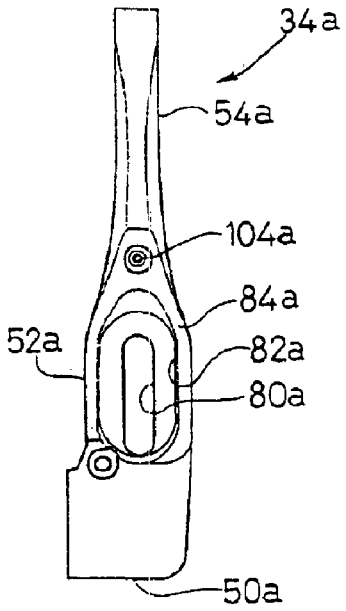
FIG. 9 is an outside elevational view of the left brake arm of the brake device illustrated in FIGS. 2–6 with the cover and lid removed.
Figure 10:
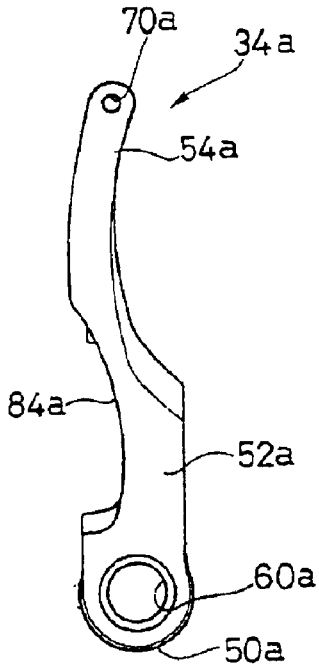
FIG. 10 is a front elevational view of the left brake arm illustrated in FIG. 9 with the cover and lid removed.
Figure 11:
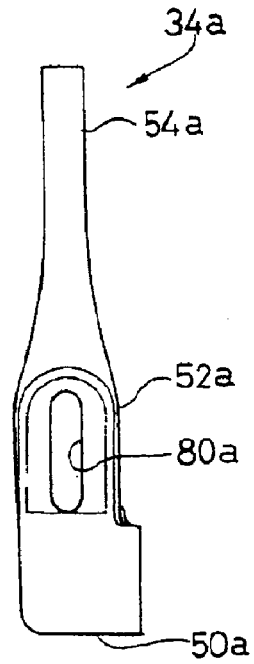
FIG. 11 is an inside elevational view of the left brake arm illustrated in FIGS. 9 and 10 with the cover and lid removed.
Figure 12:
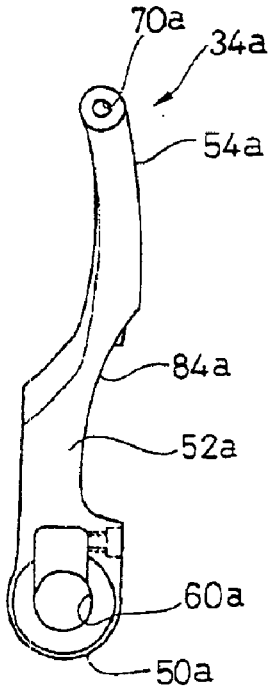
FIG. 12 is a rear elevational view of the left brake arm illustrated in FIGS. 9–11 with the lid and cover removed.
Figure 13:
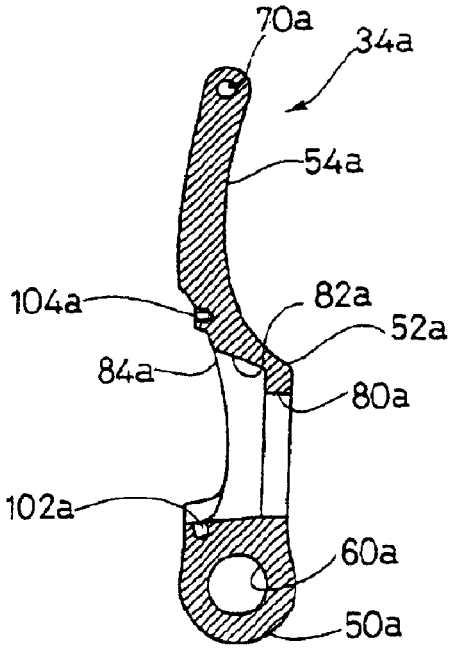
FIG. 13 is a longitudinal cross-sectional view of the left brake arm illustrated in FIGS. 9–12 with the cover and lid removed.
Figure 14:
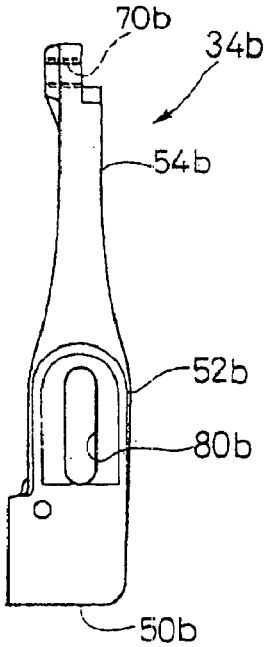
FIG. 14 is an inside elevational view of the right brake arm for the brake device illustrated in FIGS. 2–6 in accordance with the first embodiment of the present invention and with the cover and lid removed.
Figure 15:
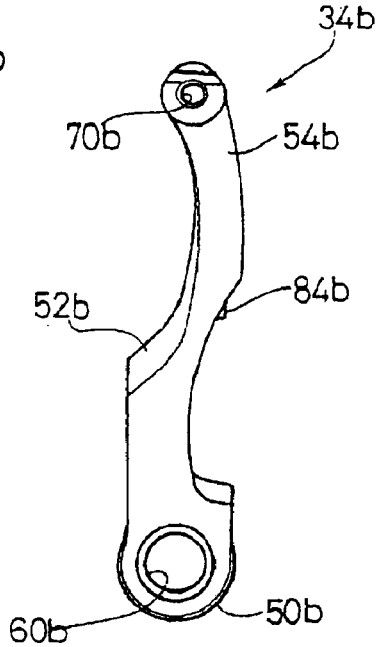
FIG. 15 is a front elevational view of the right brake arm illustrated in FIG. 14 with the cover and lid removed.
Figure 16:
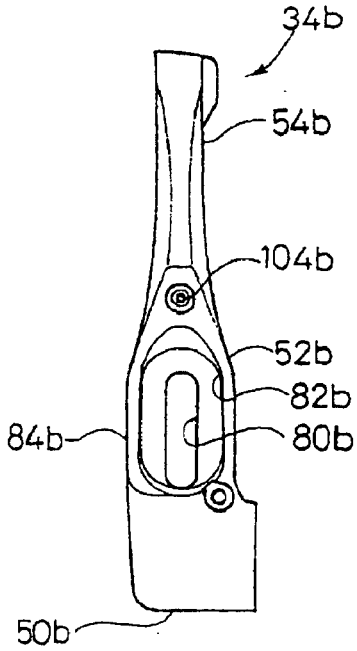
FIG. 16 is an outside elevational view of the right brake arm illustrated in FIGS. 14 and 15 with the cover and lid removed.
Figure 17:
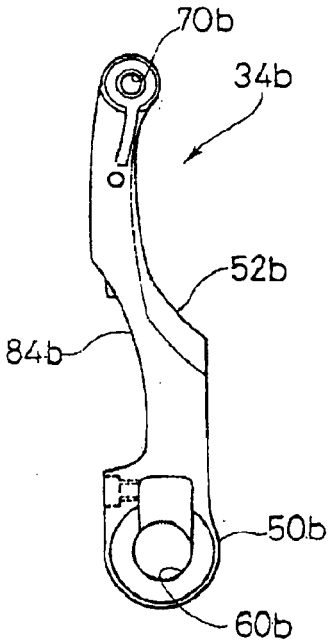
FIG. 17 is a rear elevational view of the right brake arm illustrated in FIGS. 14–16 with the lid and cover removed.
Figure 18:
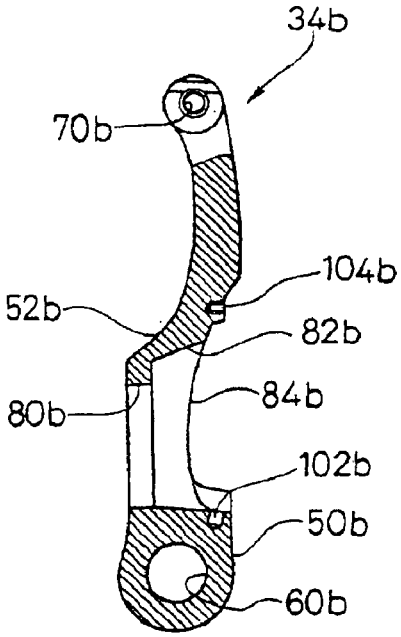
FIG. 18 is a partial longitudinal cross-sectional view of the right brake arm illustrated in FIGS. 14–17 with the cover and lid removed.
Figure 19:
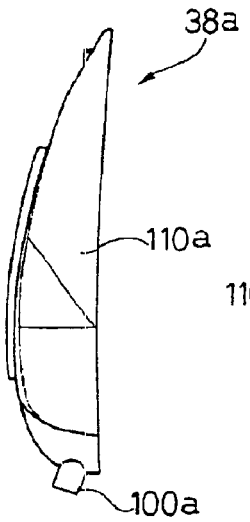
FIG. 19 is a rear side elevational view of the left lid for the left brake arm of the brake device illustrated in FIGS. 2–6.
Figure 20:
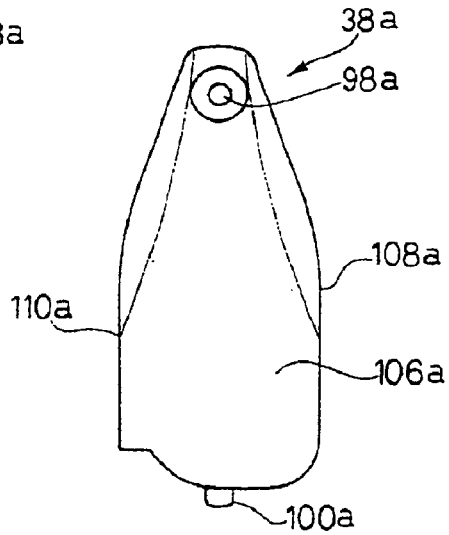
FIG. 20 is an outside elevational view of the left lid illustrated in FIG. 19 for the left brake arm of the brake device illustrated in FIGS. 2–6.
Figure 21:
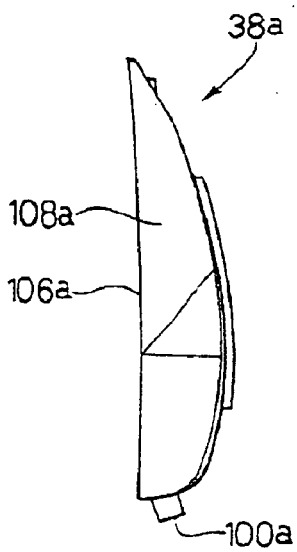
FIG. 21 is a front side elevational view of the left lid illustrated in FIGS. 19-and 20 for the left brake arm of the brake device illustrated in FIGS. 2–6.
Figure 22:
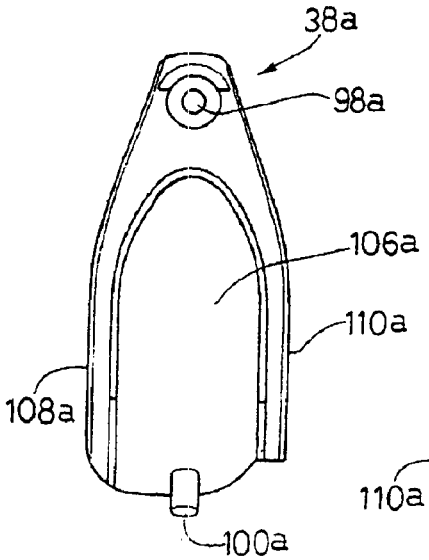
FIG. 22 is an inside elevational view of the left lid illustrated in FIGS. 19–21 for the left brake arm of the brake device illustrated in FIGS. 2–6.
Figure 23:
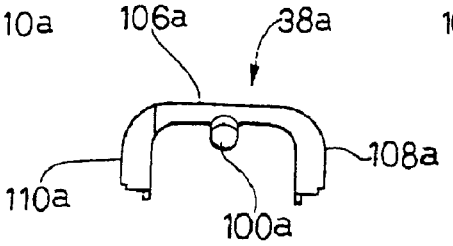
FIG. 23 is a bottom plan view of the left lid illustrated in FIGS. 19–22 for the left brake arm of the brake device illustrated in FIGS. 2–6.
Figure 24:
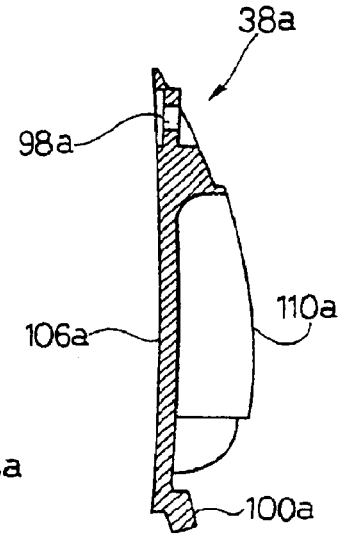
FIG. 24 is a longitudinal cross-sectional view of the left lid illustrated in FIGS. 19–23 for the left brake arm of the brake device illustrated in FIGS. 2–6.
Figure 25:
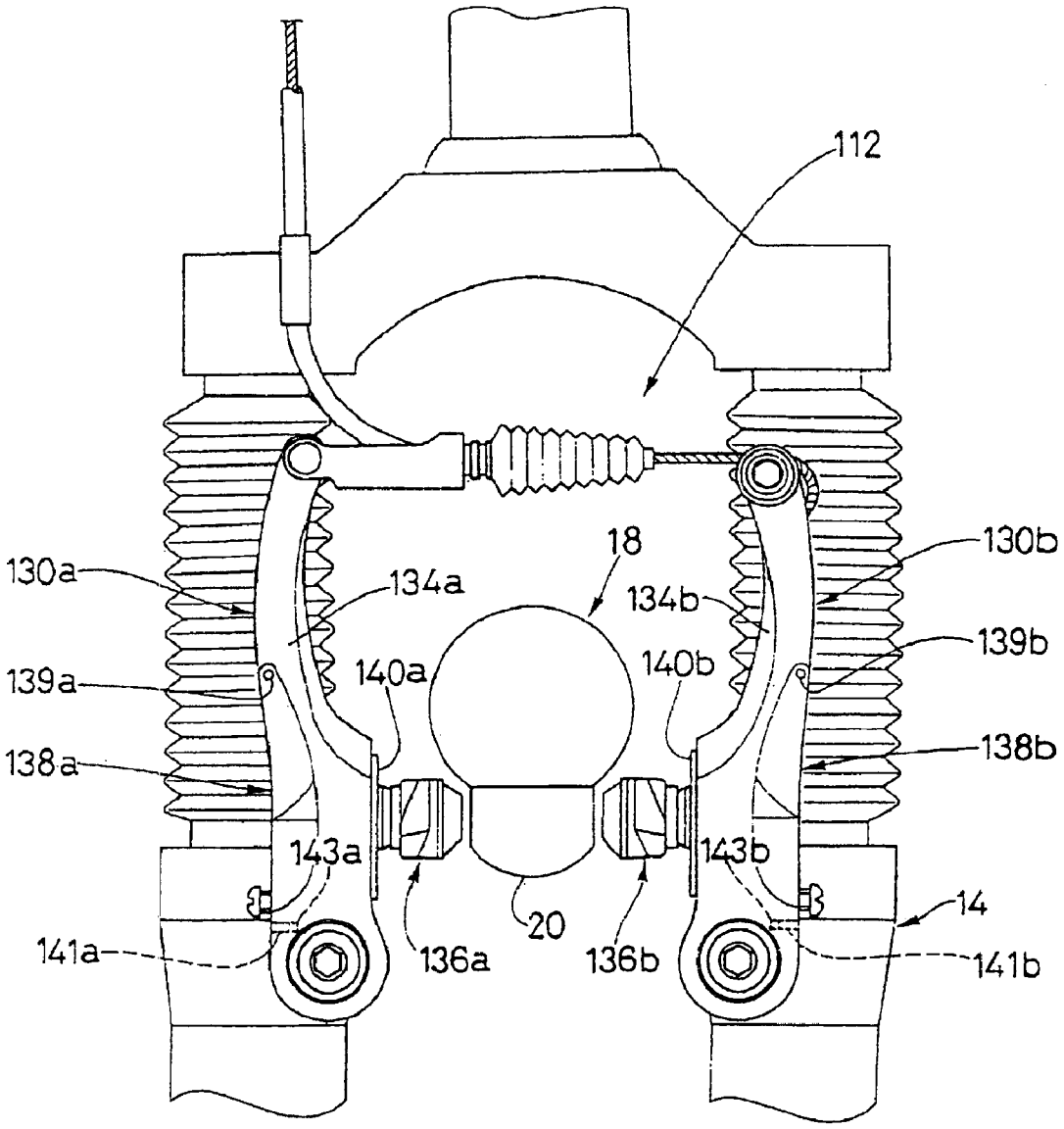
FIG. 25 is a front elevational view of a brake device in accordance with the second embodiment of the present invention.
Figure 26:
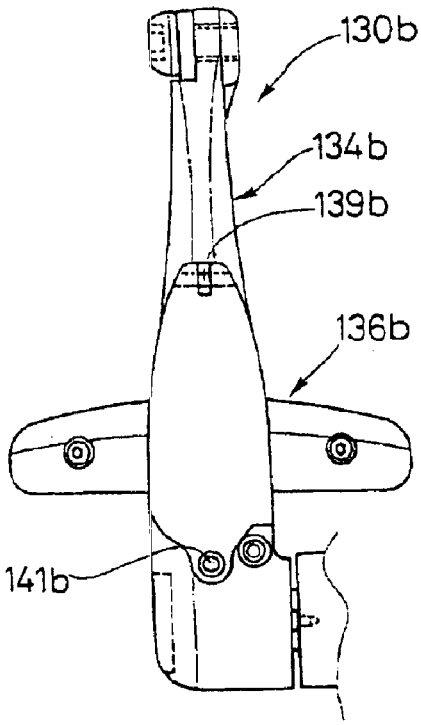
FIG. 26 is an outside elevational view of a right brake arm illustrated in FIG. 25 in accordance with the second embodiment of the present invention.
Figure 27:
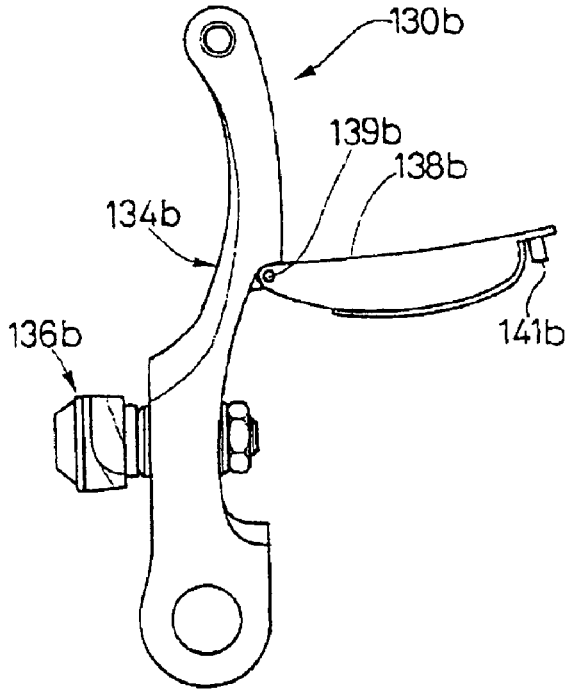
FIG. 27 is a front elevational view of the right brake arm illustrated in FIGS. 25 and 26 in accordance with the second embodiment of the present invention with the lid pivoted to an open position.
Figure 28:
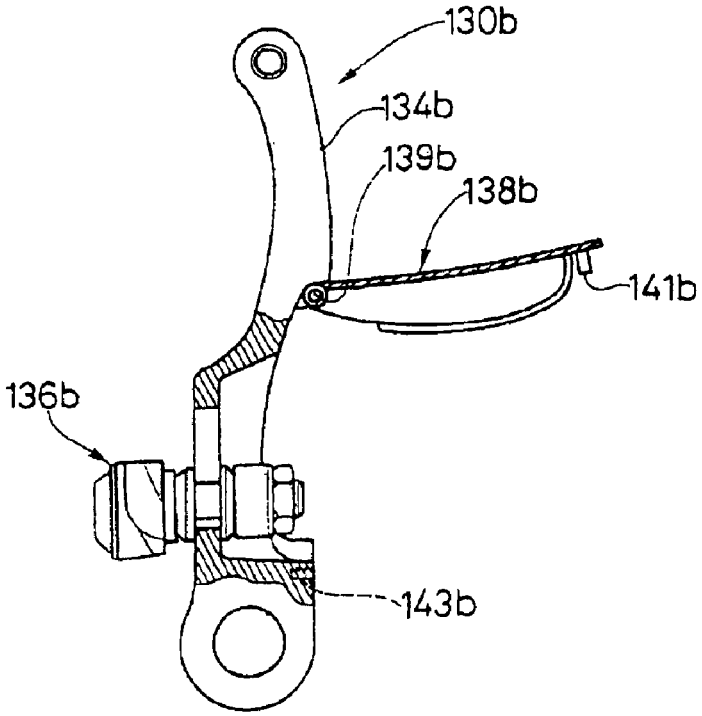
FIG. 28 is a front elevational view of the right brake arm illustrated in FIGS. 25–27 in accordance with the second embodiment of the present invention with the lid pivoted to an open position and certain portions broken away for purposes of illustration.

In this embodiment, as seen in FIGS. 7 and 8, the lids 38a and 38b are attached to the brake arm bodies 34a and 34b by a fasteners or screws 96a and 96b. More specifically, the lids 38a and 38b are provided with opening 98a and 98b at their upper end and protrusions 100a and 100b at their lower ends. The protrusions 100a and 100b are received in recesses or notches 102a and 102b, respectively, that are formed in the brake arm bodies 34a and 34b. The screw 96a and 96b are threadedly received in threaded bore 104a and 104b in the brake arm bodies 34a and 34b, respectively. Preferably, the protrusions 100a and 100b and recesses 102a and 102b are located such that the lids 38a and 38b conceals the protrusions 100a and 100b and recesses 102a and 102b after the lids 38a and 38b are installed onto the brake arm bodies 34a and 34b.

The lids 38a and 38b in the illustrated embodiment have a side section 106a or 106b, a front section 108a or 108b and a rear section 110a or 110b which are arranged to form substantially U-shaped lids 38a and 38b when viewed as seen in FIGS. 7 and 8. Of course, it will be apparent to those skilled in the art from this disclosure that the lids 38a and 38b and brake arm bodies 34a and 34b can have other configurations to carry out the present invention. The benefit of the current design is that a tool can be easily inserted onto the nuts 94a and 94b and then rotated.

Covers 40a and 40b are substantially plate-like members with each having a single bore 111a or 111b that has a diameter that is substantially equal to slightly larger than the diameter of the fixing bolts 90a and 90b. Covers 40a and 40b are designed to overlie the attachment openings 80a and 80b of the brake arm bodies 34a and 34b to prevent contaminants from entering into the hollow area formed between the brake arm bodies 34a and 34b and the lids 38a and 38b. Preferably, the bores 111a and 111b are offset to one edge of the covers 40a and 40b so that when the brake shoes 36a and 36b are vertically adjusted, the covers 40a and 40b can move vertically with shoes 36a and 36b and still cover the attachment openings 80a and 80b. More specifically, by having the bores 111a and 111b offset from the centers of the covers 40a and 40b, the covers 40a and 40b can be flipped 180° such that when the fixing bolts 90a and 90b are in the upper end, the lower portion of the attachment opening 80a and 80b remains covered. Likewise, when the brake shoes 36a and 36b and their fixing bolts 90a and 90b are located at the lower ends of the attachment openings 80a and 80b, the covers 40a and 40b are flipped so that the upper ends of the attachment openings 80a and 80b are covered.

In operation, when the rider operates the brake lever of brake operating device 22, the inner wire 24a of cable 24 is pulled within the outer casing 24b of cable 24 and the sleeve 42a so that the upper portions of brake arm bodies 34a and 34b are pulled inwardly. Thereafter, the friction pads 88a and 88b on brake shoes 36a and 36b are pressed against the side surfaces of rim 20, thus causing a braking action to be performed. Once the rider releases the brake lever of brake operating device 22, the inner wire 24a of cable 24 is relaxed so that coil springs of the biasing mechanisms 62a and 62b within the brake arm bodies 34a and 34b cause the brake arm bodies 34a and 34b to pivot in the opening direction. As a result, the tip ends of the friction pads 88a and 88b on the brake shoes 36a and 36b are withdrawn from the side surfaces of rim 20 so that the braking action is released.

Second Embodiment

Referring now to FIGS. 25–28, a brake device 112 is illustrated in accordance with a second embodiment of the present invention. Basically, the brake device 112 has first and second brake arms 130a and 130b which are pivotally coupled at their lower ends to the bicycle frame and coupled at their upper ends to a brake cable. Generally, the brake arm 130a is a mirror image of the brake arms 103b, except for the manner in which the cable is attach thereto.

The brake arm 130a has a brake arm body 134a, a brake shoe 136a, a lid 138a and a cover 140a. Similarly, the brake arm 130b has a brake arm body 134b, a brake shoe 136b, a lid 138b and a cover 140b. This second embodiment is substantially identical to the first embodiment. Therefore, this embodiment will not be discussed or illustrated in detail herein. Moreover, it will be apparent to those skilled in the art from this disclosure that the description of the parts of the first embodiment applies to the similar or identical corresponding par of the second embodiment. The basic difference between this embodiment and the first embodiment is the way in which the lids 138a and 138b are connected to the brake arm bodies 134a and 134b.

In the second embodiment, the lid 138a is pivotally or hingedly coupled at its upper end via a pivot pin 139a and detachably coupled at its lower end to the brake arm body 134a via a threaded fastener or screw 141a that is received in a threaded bore 143a of the brake arm body 134a. Likewise, the lid 138b is pivotally or hingedly coupled at its upper end via a pivot pin 139b and detachably coupled at its lower end to the brake arm body 134b via a threaded fastener or screw 141b that is received in a threaded bore 143b of the brake arm body 134b.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A brake arm for a bicycle brake device, said brake arm comprising:

a brake arm body having a pivot end configured to be pivotally coupled to a bicycle, a cable attachment end spaced from said pivot end, a brake shoe attachment opening located between said pivot end and said attachment end, and a brake shoe fastener recess located adjacent said attachment opening; and a lid detachably coupled to said brake arm body to completely overlie said fastener recess.

2. A brake arm for a bicycle brake device according to claim 1, wherein said lid is detachably coupled to said brake arm body by a screw.

3. A brake arm for a bicycle brake device, said brake arm comprising:

a brake arm body having a pivot end configured to be pivotally coupled to a bicycle, a cable attachment end spaced from said pivot end, a brake shoe attachment opening located between said pivot end and said attachment end, and a brake shoe fastener recess located adjacent said attachment opening; and a lid detachably coupled to said brake arm body by a screw to overlie said fastener recess, said lid including a protrusion that engages a hole in said brake arm body.

4. A brake arm for a bicycle brake device according to claim 2, wherein said lid is pivotally coupled to said brake arm body.

5. A brake arm for a bicycle brake device according to claim 1, wherein:

said brake arm body is a cantilevered arm in which said pivot end has a mounting section and said cable attachment end has a cable attachment member.

6. A brake arm for a bicycle brake device, said brake arm comprising:

a brake arm body having an attachment opening and a fastener recess located adjacent said attachment opening; and a lid detachably coupled to said brake arm body to completely overlie said fastener recess, said brake arm body [is] *being* a cantilevered arm having a pivot end with a mounting section and a cable attachment end with a cable attachment member, said cable attachment member including a connecting link, *and*

*said lid and said fastener recess are configured and arranged to completely enclose an attachment nut and a thread portion of a fixing bolt within said fastener recess.*

7. A brake arm for a bicycle brake device according to claim 5, wherein said cable attachment member includes a threaded fastener.

8. A brake arm for a bicycle brake device, said brake arm comprising:

a brake arm body having an attachment opening and a fastener recess located adjacent said attachment opening; and a lid detachably coupled to said brake arm body to overlie said fastener recess, a brake shoe having an attachment portion with a fixing bolt extending through said attachment opening of said brake arm body with a portion of said fixing bolt being concealed within said fastener recess.

9. A brake arm for a bicycle brake device according to claim 1, wherein said attachment opening is an elongated slot.

10. A brake arm for a bicycle brake device, said brake arm comprising:

a brake arm body having an attachment opening and a fastener recess located adjacent said attachment opening, *said attachment opening being an elongated slot*; [and]

a lid detachably coupled to said brake arm body to overlie said fastener recess[,]; *and*

[said attachment opening being an elongated slot,]

a cover with a bore slidably overlying said attachment opening.

11. A brake arm for a bicycle brake device according to claim 10, wherein said bore of said cover is offset from a center point of said cover towards an edge of said cover.

12. A brake arm for a bicycle brake device, said brake arm comprising:

a brake arm body having an attachment opening and a fastener recess located adjacent said attachment opening; and a lid detachably coupled to said brake arm body to completely overlie said fastener recess, said lid having a side section with a front section extending along one edge of said side section and a rear section extending along another edge of said side section to form a U-shaped cross-section.

13. A brake arm for a bicycle brake device according to claim 1, wherein:

said lid has a first end pivotally coupled to said brake arm body and a second end detachably coupled to said brake arm body by a fastening member.

14. A bicycle brake device comprising:

a first brake arm body having a first pivot end configured to be pivotally coupled to a bicycle, a first cable attachment end spaced from said first pivot end, a first brake shoe attachment opening located between said first pivot end and said first attachment end, and a first brake shoe fastener recess located adjacent said first brake shoe attachment opening; and a first lid detachably coupled to said first brake arm body to completely overlie said first fastener recess;

a second brake arm body having a second pivot end configured to be pivotally coupled to the bicycle, a second cable attachment end spaced from said second pivot end, a second brake shoe attachment opening located between said second pivot end and said second attachment end, and a second fastener recess located adjacent said second brake shoe attachment opening, said second brake arm body being adapted to be operatively coupled to said first brake arm body to move said first and second brake arm bodies between a release position and a braking position; and a second lid detachably coupled to said second brake arm body to completely overlie said second fastener recess.

15. A bicycle brake device according to claim 14, wherein said first lid is detachably coupled to said first brake arm body by a first screw, and said second lid is detachably coupled to said second brake arm body by a second screw.

16. A bicycle brake device comprising:

a first brake arm body having a first pivot end configured to be pivotally coupled to a bicycle, a first cable attachment end spaced from said first pivot end, a first brake shoe attachment opening located between said first pivot end and said first attachment end, and a first brake shoe fastener recess located adjacent said first brake shoe attachment opening; and a first lid detachably coupled to said first brake arm body by a first screw to overlie said first fastener recess;

a second brake arm body having a second pivot end configured to be pivotally coupled to the bicycle, a second cable attachment end spaced from said second pivot end, a second brake shoe attachment opening located between said second pivot end and said second attachment end, and a second fastener recess located adjacent said second brake shoe attachment opening, said second brake arm body being adapted to be operatively coupled to said first brake arm body to move said first and second brake arm bodies between a release position and a braking position; and a second lid detachably coupled to said second brake arm body by a second screw to overlie said second fastener recess, said first lid including a first protrusion that engages a first hole in said first brake arm body, and said second lid including a second protrusion that engages a second hole in said second brake arm body.

17. A bicycle brake device according to claim 15, wherein said first lid is pivotally coupled to said first brake arm body, and said second lid is pivotally coupled to said second brake arm body.

18. A bicycle brake device according to claim 14, wherein said first brake arm body is a cantilevered arm having a first cable attachment member mounted on said first cable attachment end, and said second brake arm body is a cantilevered arm having a second cable attachment member mounted on said second cable attachment end.

19. A bicycle brake device according to claim 18, wherein said first cable attachment member includes a connecting link, and said second cable attachment member includes a threaded fastener.

20. A bicycle brake device comprising:

a first brake arm body having a first attachment opening and a first fastener recess located adjacent said first attachment opening;

a first lid detachably coupled to said first brake arm body to overlie said first fastener recess;

a second brake arm body having a second attachment opening and a second fastener recess located adjacent said second attachment opening, said second brake arm body being adapted to be operatively coupled to said first brake arm body to move said first and second brake arm bodies between a release position and a braking position;

a second lid detachably coupled to said second brake arm body to overlie said second fastener recess;

a first brake shoe having a first attachment portion with a first fixing bolt extending through said first attachment opening of said first brake arm body with a portion of said first fixing bolt being concealed within said first fastener recess; and a second brake shoe having a second attachment portion with a second fixing bolt extending through said second attachment opening of said second brake arm body with a portion of said second fixing bolt being concealed within said second fastener recess.

21. A bicycle brake device according to claim 14, wherein said first and second attachment openings are elongated slots.

22. A bicycle brake device comprising:

a first brake arm body having a first attachment opening and a first fastener recess located adjacent said first attachment opening;

a first lid detachably coupled to said first brake arm body to overlie said first fastener recess;

a second brake arm body having a second attachment opening and a second fastener recess located adjacent said second attachment opening, said second brake arm body being adapted to be operatively coupled to said first brake arm body to move said first and second brake arm bodies between a release position and a braking position;

a second lid detachably coupled to said second brake arm body to overlie said second fastener recess;

a first cover with a first bore slidably overlying said first attachment opening, which is an elongated slot; and a second cover with a second bore slidably overlying said second attachment opening, which is an elongated slot.

23. A bicycle brake device according to claim 22, wherein said first bore of said first cover is offset from a center point of said first cover towards an edge of said first cover, and said second bore of said second cover is offset from a center point of said second cover towards an edge of said second cover.

24. A bicycle brake device comprising:

a first brake arm body having a first attachment opening and a first fastener recess located adjacent said first attachment opening;

a first lid detachably coupled to said first brake arm body to completely overlie said first fastener recess;

a second brake arm body having a second attachment opening and a second fastener recess located adjacent said second attachment opening, said second brake arm body being adapted to be operatively coupled to said first brake arm body to move said first and second brake arm bodies between a release position and a braking position; and a second lid detachably coupled to said second brake arm body to completely overlie said second fastener recess;

each of said first and second lids having a side section with a front section extending along one edge of said side section and a rear section extending along another edge of said side section to form a U-shaped cross-section.

25. A bicycle brake device according to claim 14, wherein said first lid has a first end pivotally coupled to said first brake arm body and a second end detachably coupled to said first brake arm body by a first fastening member, and said second lid has a first end pivotally coupled to said second brake arm body and a second end detachably coupled to said second brake arm body by a second fastening member.

* * * * *